United States Patent [19]

Kawasaki

[11] 3,820,902

[45] June 28, 1974

[54] MEASURING METHOD AND APPARATUS WHICH COMPENSATE FOR ABBE'S ERROR

[75] Inventor: Harumi Kawasaki, Tokyo, Japan

[73] Assignee: Asahi Kogaku Kogyo Kabushiki Kaisha, Tokyo, Japan

[22] Filed: Apr. 11, 1972

[21] Appl. No.: 243,035

[52] U.S. Cl. .............................. 356/106, 356/110
[51] Int. Cl. ............................................ G01d 9/02
[58] Field of Search ........... 356/106, 110, 138, 139, 356/150

[56] References Cited
UNITED STATES PATENTS
3,551,055  12/1970  Chitayat.............................. 356/110
3,692,413   9/1972  Marcy et al......................... 356/106

OTHER PUBLICATIONS
Metrology with Autocollimators, K. J. Hume; pp. 38–41; Hilger & Watts Ltd.,

*Primary Examiner*—Ronald L. Wibert
*Assistant Examiner*—Conrad Clark
*Attorney, Agent, or Firm*—Steinberg & Blake

[57] ABSTRACT

A measuring method and apparatus for measuring linear magnitudes while compensating for Abbe's error. A single laser unit measures a linear distance along an optical axis with a laser interferometer, this distance along the optical axis corresponding to an equal distance along a measuring axis which is parallel to and spaced from the optical axis by a given distance. Angular deviation of a body which moves along the optical axis to determine the measurement of the distance therealong produces at the measuring axis an error distance determined by the extent of angular deviation of the body and the distance between the optical and measuring axes. The extent of angular deviation of the body with respect to the optical axis is measured and converted by a detecting structure into compensating units which are of equal magnitude with units counted by a reversible counter in response to operation of the interferometer in order to determine the distance of movement of the body along the optical axis. The compensating units correspond to the error distance along the measuring axis resulting from angular deviation of the body at the optical axis, and these compensating units are added to or subtracted from the units counted during operation of the interferometer in order to achieve an accurate measurement which compensates for Abbe's error.

9 Claims, 7 Drawing Figures

Fig. 3
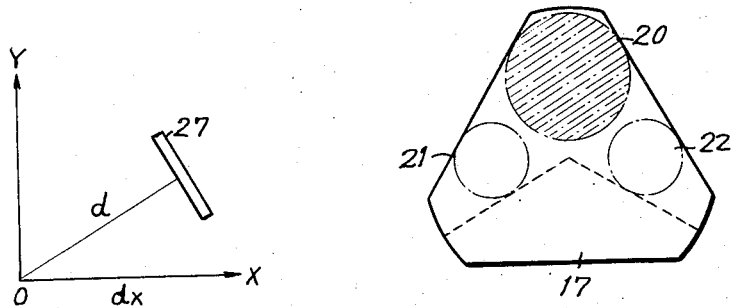
Fig. 2 (c)
Fig. 4 (a)
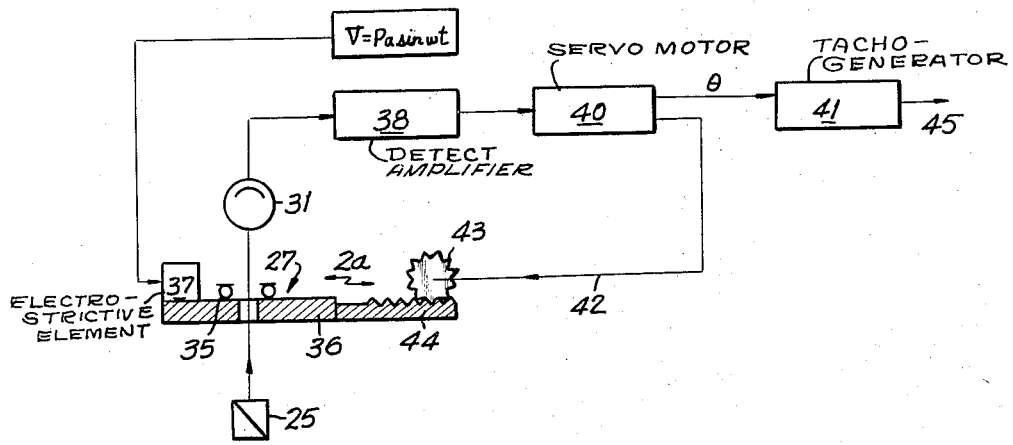
Fig. 4 (b)
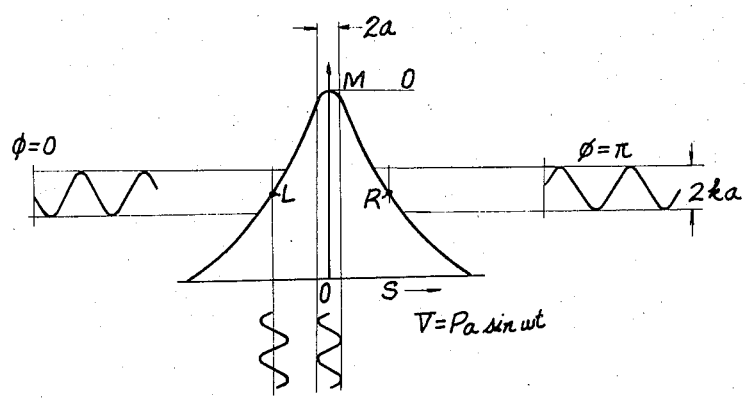

MEASURING METHOD AND APPARATUS WHICH COMPENSATE FOR ABBE'S ERROR

BACKGROUND OF THE INVENTION

The present invention relates to a measuring method and apparatus.

In particular, the present invention relates to that type of measuring apparatus and method which achieves precise measurements of linear distances by utilizing a laser interferometer. Known measuring devices of this type utilize a two light bundle interferometer having a laser light source, particularly a helium-neon laser which has a stabilized oscillation frequency. These known devices achieve a linear measurement according to a known fringe-count method where the digits or units which are counted correspond to one-fourth or one-eighth of the wavelength $\lambda$ of the laser light. There is a known device which utilizes a two light bundle interferometer with a helium-neon laser to carry out simultaneous oscillation at two frequencies in order to achieve optical heterodyne detection of the Doppler beat of two wavelengths which accompany movement of a moving mirror so as to measure automatically the magnitude and velocity of displacement.

With structures of the above type it is conventional to compensate automatically for errors which inevitably accompany interference linear measurement such as linear measurement errors resulting from variation in air pressure and temperature and errors resulting from thermal expansion of the object which is measured, so that in this way accuracy of measurement is assured.

However, with known measuring devices of the above type, it is possible to achieve accurate measurement values only when the measuring axis of the object which is measured is coaxial with the optical axis of the length measuring structure. If the measurement axis is not coaxial with the optical axis of the length-measuring structure, the mechanical angular meandering of the object to be measured results in an error known as Abbe's error, and under these conditions it is impossible to achieve accurate linear measurement.

During practical uses of devices of this type, for example in the case where the pitch error of a feed-guide screw is to be measured, the optical axis of the length-measuring structure does not coincide with the measurement axis (the position of the effective diameter of the guide screw), and Abbe's error due to mechanical limitations is the result. Particularly when dealing with two dimensional measurements, such as in the reading of Cartesian coordinates, the Abbe errors of both coordinate axes are related to each other so that correcting compensation for the linear measurement values becomes complex. In the case where the meandering angle is 1° and the displacement between the optical and measuring axes is on the order of 100 mm, Abbe's error is approximately $30\mu$. It is clear, therefore, that an error of this latter magnitude is not negligible when achieving precise measurement of linear distances.

SUMMARY OF THE INVENTION

It is accordingly a primary object of the present invention to provide a method and apparatus which will avoid the above drawbacks.

In particular, it is an object of the invention to provide a method and apparatus capable of automatically detecting Abbe's error and automatically introducing a compensation signal in the measured distance in order to achieve an accurate measurement which eliminates this error.

A further object of the present invention is to provide a method and apparatus utilizing only a single laser light source both for linear measurement and for measurement of angular error.

Also it is an object of the invention to provide a structure of the above type which utilizes at least one optical element which is common both to the linear measuring structure and the angular measuring structure.

Thus, it is an object of the invention to carry out the operations with a single assembly which performs both linear measurement and angular error measurement, so that a separate assembly for error detection is not required.

Thus, it is an object of the invention to provide a measuring structure capable of being used in manufacturing plants, factories, and the like, with this structure being compact, in a condition of readiness for operation, and having a great mobility.

It is also an object of the invention to provide a method an apparatus capable of utilizing the distance between the optical axis and the measuring axis as an input to an angular compensation circuit so that the method and apparatus of the invention are of a wide practical use.

It is furthermore an object of the invention to provide a method and apparatus of the above type which is highly adaptable so that it can be used in connection with two axes which form a pair of perpendicular coordinates, for example.

Furthermore, it is an object of the invention to provide an automatic compensation of Abbe's error where the measured length value can be real-time processed utilizing an electron circuit system to achieve great advantages.

According to the invention the measuring apparatus includes a laser means which has an optical axis. A linear measuring means coacts with the laser means for movement along its optical axis and for linearly measuring a distance along a measuring axis which is parallel to and spaced at a given distance from the optical axis. An angular measuring means coacts with the laser means as well as with the linear measuring means for measuring angular deviation of the linear measuring means with respect to the optical axis so as to detect an error in the operation of the linear measuring means, this laser means being in the form of a unitary laser assembly which is common to both of the measuring means.

According to the method of the invention the extent of error along the measuring axis is measured in units corresponding to those which are counted for determining the linear measurement, and the error units are either added to or subtracted from the counted units of linear measurement in order to arrive at an accurate result.

BRIEF DESCRIPTION OF DRAWINGS

The invention is illustrated by way of example in the accompanying drawings which form part of this application and in which:

FIG. 3 is a diagrammatic representation of one of the methods for optical compensation where Abbe's error appears in the directions of the mutually perpendicular X and Y coordinates;

FIG. 4(a) is a partly sectional diagrammatic representation of the error-detecting structure and method of the invention; and FIG. 4(b) is a wave diagram further illustrating the manner in which the apparatus and method of the invention operate to achieve accurate measurements.

DESCRIPTION OF PREFERRED EMBODIMENTS

Figure 1:
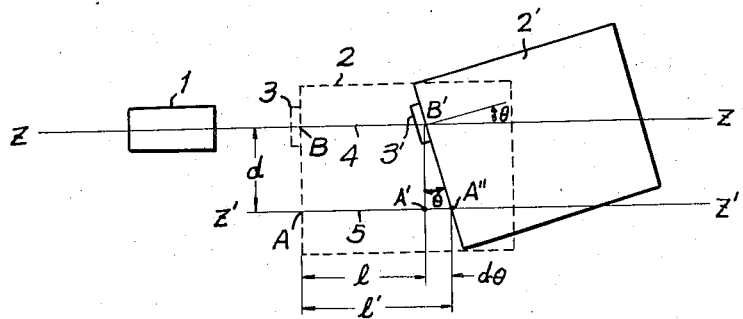
FIG. 1 is a diagrammatic illustration of the occurrence of Abbe's error in connection with linear measurement.

Referring first to FIG. 1, there is diagrammatically illustrated therein the manner in which Abbe's error occurs. FIG. 1 schematically illustrates an optical linear measuring means 1 having the construction, for example, of a laser interferometer. This measuring means 1 has a optical axis ZZ. The desired linear distance which is to be measured is situated along a measuring axis Z'Z' which is parallel to the optical axis ZZ and which is spaced therefrom by the distance $d$.

The linear measuring means measures the movement of a movable body from the dotted line position 2 thereof to the solid line position 2' indicated in FIG. 1. Thus, the movable body moves through the linear distance 4 along the optical axis ZZ, this distance 4 being equal to the distance between the points B and B', and it will be noted that the measuring means includes a reflector fixed to the movable body and moving therewith from the position 3 to the position 3' which are respectively illustrated in dotted and solid lines. The distance 4 is equal to the distance 5 along the measuring axis Z'Z', this distance 5 extending between the points A and A'. However, due to mechanical limitations it is not possible for the body 2 to remain at the attitude shown in dotted lines and an unavoidable angular deviation takes place so that the body assumes the angular position shown in solid lines at the position 2' for the body. This angular deviation $\theta$ results, due to the distance $d$ between the optical axis ZZ and measuring axis Z'Z', in a location of the end of the distance 5 from the point A not at A' but instead at the point A''. Thus, instead of achieving along the measuring axis Z'Z' a distance $l$ equal to BB', there is achieved instead the erroneous distance $l'$ which has an error distance equal to A'A'', this error distance being represented by $d\theta$. Thus, this latter distance along the measuring axis provides with respect to the distance BB' along the optical axis the error which is known as Abbe's error.

Figure 2:
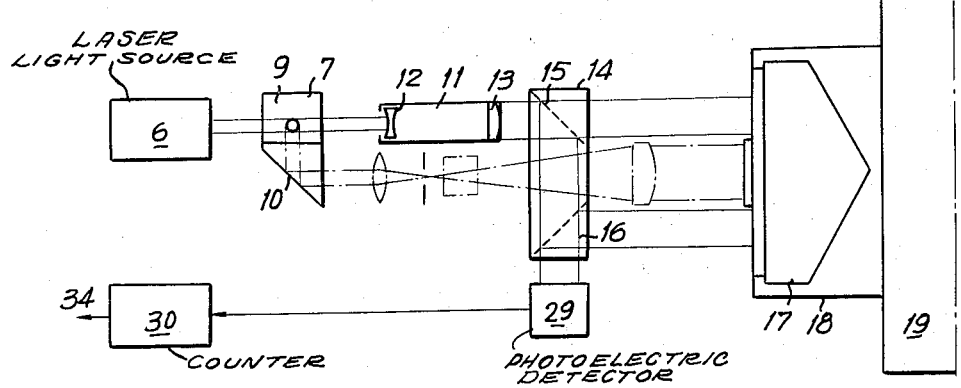
FIG. 2(a) is a schematic illustration showing in a top plan view one embodiment of the invention.
FIG. 2(b) is a schematic elevation of the structure of FIG. 2(a)
FIG. 2(c) is a front elevation of a light-directing means which is common to the linear and angular measuring means, FIG. 2(c) showing schematically the areas where light coacts with the prism.
Figure 2:
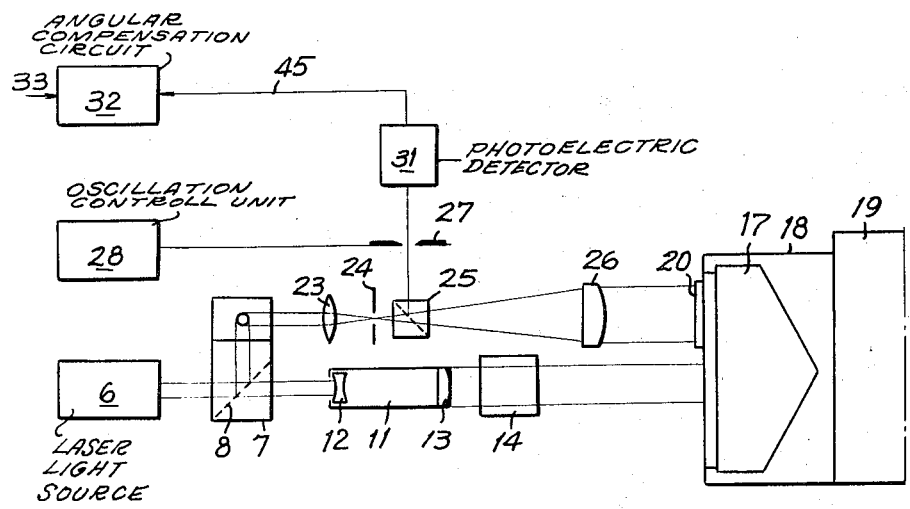

FIGS. 2(a) and 2(b) illustrate one example of the invention where a type of auto-collimator assembly is made up of a laser interferometer section and a section for detecting Abbe's error. The structure of the invention shown in FIGS. 2(a) and 2(b) includes a linear measuring means and an angular measuring means both of which coact with a laser means. The laser means includes a laser light source 6 from which a light beam issues. The light from the source 6 impinges upon a semi-transparent face 8 of a beam splitter means 7. Through this beam splitter means 7 the laser light beam is divided into two beams one of which is received in a beam enlarger 11 which forms part of the linear measuring means which has the construction of an interferometer. The other part of the beam is directed by the totally reflecting surfaces 9 and 10 of the beam splitter means 7 to a converging lens 23 of the autocollimator, this lens 23 forming part of the angular measuring means.

The laser interferometer section which forms the linear measuring means is a modified Michelson's interferometer. The laser light which has been converted into a parallel beam having a diameter of several millimeters due to the action of the beam enlarger impinges on a semi-transparent face 15 of a second beam splitter 14, the beam splitter 14 forming part of the linear measuring means while the source 6 and the beam splitter 7 are common to the linear and angular measuring means. One half of the beam which reaches the semi-transparent face 15 of beam splitter 14 travels through the face 15 and enters a light-directing means 17 in the form of a corner-cube prism, the area 21 at which this light enters the light-directing means 17 being indicated in FIG. 2(c). This light which enters through the area 21 is internally reflected by the light-directing means 17 so as to issue therefrom at the area 22 indicated in FIG. 2(c), and thus there will issue from the light-directing means 17 a light beam which is parallel to that which enters the light-directing means 17, the entering light having passed through the semi-transparent surface 15 of the beam splitter 14, as pointed out above. The parallel beam which issues from the light-directing means 17 reaches a second semi-transparent reflecting face 16 of the beam splitter 14. The light reflected by the semi-transparent surface 16 is received by a photoelectric detector 29. This detector 29 also receives light which is reflected by the face 15 and which travels through the face 16 to the detector 29. Thus, the light which is reflected by the face 15 and the light which passes therethrough and is reflected back from the light-directing means 17 both meet at the face 16 to produce interference fringes.

The corner-cube prism which forms the light-directing means 17 is fixed by way of a suitable mounting structure 18 to a movable body 19 which corresponds to the body shown in FIG. 1 at the positions 2 and 2' with the light-reflecting means 17 corresponding to the reflector shown in FIG. 1 at the positions 3 and 3'. The variations in the interference fringes produced by the movement of the movable body 19 is detected by the photoelectric detector 29 so as to produce counting pulses having a unit equal to one-fourth or one-eighth of the laser wavelength. These counting pulses are counted by a reversible counter means 30 which has an output 34 indicative of the linear distance which is measured. The reversible counter means 30 is provided in a known way with a compensating circuit to compensate for influences resulting from variation in temperature and air pressure during the time when measurements are carried out as well as to compensate for the coefficient of thermal expansion of the object which is to be measured. Thus, the output 34 will give an indication of the result of the counting carried out by the counter means 30, to achieve an accurate value of the magnitude of the distance travelled by the moving object to be measured insofar as these operations are carried out on the laser interference optical axis.

As was indicated above, this measurement is not fully accurate because it does not take into account Abbe's error. Detection of the latter error is carried out with the angular measuring means at the auto-collimator section. As may be seen from FIG. 2(b), the laser beam passes through an autocollimator converging lens 23 and converges at an illuminating slit 24. Then the laser beam passes through a collimator lens 26 and is reflected by a totally reflecting surface 20 at the face of incidence of the corner-cube prism. The area of the surface 20 is indicated in shaded lines in FIG. 2(c).

Inasmuch as the entering and issuing beams of the interferometer, which enter into and issue from the light-directing means 17 at the areas 21 and 22, are perfectly parallel with each other because of the operation of the corner-cube prism, in order to detect angular variation due to meandering of the body 19 with respect to the optical axis, the totally reflecting face 20 is provided at the face of incidence of the light-reflecting means 17. This use of the light-reflecting means 17 both for the purposes of linear measurement and angular measurement is one of the important features of the present invention.

The light which is thus reflected from the totally reflecting face 20 passes through the collimator lens 26 and is reflected by the semi-transparent prism 25 through which the light initially passed when travelling toward the lens 26. The light reflected by the semi-transparent prism 25 forms an image of an extremely small spot at the plane of an oscillating slit which is formed in an oscillating member 27 of the angular measuring means. The unit 28, details of which are described below in connection with FIG. 4(a), is operatively connected with the member 27 for controlling the oscillation thereof. If it is assumed that the focal length of the collimator lens 26 is $f$ and the meandering angle of the body 19 is $\alpha$, then the spot of light in the plane of the oscillating slit of member 27 is moved $2\alpha f$ $= S$ from the optical axis. Various methods are available for photoelectrically detecting the displacement of this light spot, and a detailed description of the method used in the illustrated example is presented below.

Assuming that by using the oscillating slit of member 27 and a photoelectric detector 31 on the opposite side of member 27 from prism 25 it is possible to detect the meandering angle of the corner-cube prism including the direction of angular deviation as indicated by a plus or minus sign, the detected signal is then applied to an angular compensation circuit 32 where it is transformed into pulses in the following manner:

The distance between the measuring axis and the optical axis is precisely known according to the linear measuring means which is actually utilized. If the meandering angle is $\theta$ when the moving body 19 travels through the distance $l$ and the desired accuracy of the measurement system is $\sigma$ (in practice a value of $\lambda/4$ or $\lambda/8$ is selected), then sequential compensation is carried out each time the error $d\theta$ exceeds the unit $\sigma$. One angular compensation pulse (with its sign represented) is produced each time $\pm d\theta \geq |\sigma|$. The scale factor d may be given to the angular compensation circuit 32 by, for example, a decimal dial, and the input of this factor is represented by the arrow 33 in FIG. 2(b). The distance travelled by the moving body 19 is counted and indicated by the reversible counter means 30, as pointed out above. At any time during the reversible counting which is carried out by the reversible counter means 30, a correction count value 1 is added to or subtracted from the total counted by the reversible counter means 30 in response to the angular compensation pulses achieved from the angular measuring means, so that the output 34 of the reversible counter means gives an accurately measured value with compensation of Abbe's error. Thus, the angular compensation circuit 32 coacts not only with the angular measuring means but also with the reversible counter means 30 in order to automatically compensate the value counted thereby with the same units which are counted by the counter means 30. As is indicated in FIG. 2(b) the output of the detector 31 is transmitted to the compensation circuit 32, as indicated by the arrow 45.

A description of one example of a method for photoelectrically detecting the angular error follows:

FIG. 4(a) illustrates one example of a photoelectric detection structure for the auto-collimator. The member 27 is held on base 36 by ball members 35 with the slit of the member 27 aligned with a larger opening formed in the base 36, as illustrated in FIG. 4(a). The diameter of the angular error detection spot, which is formed at the plane of the oscillating slit of member 27 by the beam which has been acted upon by the beam splitter 25, can be made as small as permitted by limitations of the aberration of the collimator lens 26 and the limitation of diffraction. This diameter is at most on the order of several $\mu$m. The width of the oscillating slit of member 27 is made equal to this diameter of the angular error detection spot. The member 27 is connected with an electro-strictive element 37 to which there is applied an AC voltage $V = Pa \sin \omega t$ ($P$ is a constant while the frequency is, for example, $\omega = 450$) so that the oscillating slit of member 27 carries out a simple harmonic, sinusoidal motion in a horizontal direction having the amplitude $a$. The displacement of the spot S on the oscillating slit plane of member 27 due to the meandering angle of the moving body 19 is: $S = 2 \alpha f$, as pointed out above. At this time the output voltage Ed of the photoelectric detector 31 is of a triangular waveform as indicated in FIG. 4(b).

A servo system in which the center of the oscillating slit of member 27 follows the center of the angular error detection spot is illustrated by the electro-mechanical system formed by components 38–45. In FIG. 4(b), the AC amplitude and phase detected by the photoelectric detector 31 vary with the spot displacement S. The detected voltages are 0 at the center of the optical axis and of an amplitude 2ka at the positions L (phase 0) and R (phase $\pi$).

These voltages are detected by the photoelectric detector 31 and then phase-detected by a detect-amplifier 38. Accordingly, the output of the detect-amplifier 38 provides an error voltage which is approximately proportional to the spot displacement S. This error output excites a servomotor 40. The shaft of the servomotor is connected at one end to a tacho-generator 41 and at its other end to a pinion 43 through a shaft 42. A rack 44 meshes with the pinion 43 and is fixed with the reciprocating body 36 which forms the slit member 27. In this way the member 27 is driven until the center of the slit thereof coincides with the center of the detection spot. The tacho-generator 41 has an output 45 which is proportional to spot displacement S. Instead of a tacho-generator 41 it is possible to use a precision rotation type of potentiometer. This voltage 45 represents the angular detection signal applied to the angular compensation circuit 32.

As an example, if it is assumed that the focal length of collimator lens 26 is $f = 300$ mm and $\alpha = 10' \approx 3 \times 10^{-3}$ rad, then $S = 1.8$ mm. On the other hand, for the amplitude $a$ of the oscillating slit, corresponding to $\alpha = 0.5''$, $a - 1.5\mu$ or a smaller value is sufficient.

Meandering is generally produced in horizontal and vertical directions X and Y, as indicated in FIG. 3. If the distance between the measurement axis and the optical axis is $d$ (FIG. 3), then the oscillating slit of member 27 must be arranged perpendicularly to the straight line $d$. For this purpose the element 36 which forms the member 27 provided with the oscillating slit is arranged so as to be capable of swinging by a predetermined angle.

For the purpose of angular detection it is possible to use also other known methods. For example, it is possible to use a commercially obtainable photoelectric auto-collimator in which there is relative to a fixed slit a parallel plane glass plate arranged immediately before the fixed slit and oscillated electro-magnetically.

The above-described linear measuring means formed by the laser interferometer is based on the so-called fringecount system. It is also possible to apply the angular detection system according to the present invention to other linear measuring interferometers, for example the Doppler beat system interferometer referred to above which utilizes a two wavelength laser, since also with this latter interferometer construction it is possible to select in the same way the light bundle at the entering face of the corner-cube prism, as shown in FIG. 2(c).

Thus, with the present invention it is capable of assuring a high accuracy in practical measurements by automatically compensating Abbe's error which results from defects of the components in any geometric measurement system for precisely carrying out linear measurements as referred to above.

The above-described method and apparatus of the present invention have a number of advantages. Thus, one great advantage resides in the fact that the interference linear measuring means and the angular error measuring means have the same laser light bundle for common use. In addition, both of the measuring means use a single optical element which is formed by the corner-cube prism 17. Therefore, with the present invention the detection of Abbe's error is made not by an independent system separate from the linear measuring means but instead the two operations are carried out by a single unitary assembly. As a result with the invention there is a measuring apparatus and method which lends itself to practical use in any manufacturing plant or factory and which is compact, in a state of readiness for operation at all times, and of great mobility. Furthermore, with the invention it is possible to apply the distance $d$ between the measuring axis and optical axis as the input to the angular compensation circuit so that the method and apparatus of the invention are capable of wide use in practical linear measurement operations. In view of the fact that the angular deviation takes place along the mutually perpendicular coordinates, as discussed above in connection with FIG. 3, it is possible to swingably arrange the spot-detecting slit of member 27 for greater adaptability of the method and apparatus of the invention. In addition, with respect to the automatic compensation of the angular error, the measured linear value can be real-time processed with utilization of an electron circuit system, so as to achieve in this way also a great advantage.

What is claimed is:

1. In a measuring apparatus for measuring the linear distance of movement of a body along a measuring axis, laser means having an optical axis, which is parallel to and spaced at a given distance from the measuring axis, linear measuring means comprising an interferometer and coacting with said laser means along said optical axis for linearly measuring a distance along said optical axis, angular measuring means including an auto-collimator and coacting with said laser means along the measuring axis for measuring, simultaneously with operation of said linear measuring means, angular deviation of the body with respect to said optical axis, and output means cooperating with said angular measuring means for converting said angular deviation into a linear distance based upon said given distance between said two axes and for combining the last mentioned linear distance with the linear distance measured by the linear measuring means to provide the linear distance along the measuring axis, said laser means being in the form of a unitary laser assembly which is common to both of said measuring means.

2. The combination of claim 1 and further comprising a single light-reflecting means fixed to said body for movement therewith and forming part of both measuring means.

3. The combination of claim 2 and wherein said linear measuring means has a light-reflecting portion formed by part of said light-reflecting means and said angular measuring means including a light-reflecting surface formed by another part of said light-reflecting means.

4. The combination of claim 1 and wherein said output means includes a reversible counter means operatively connected with said linear measuring means for responding thereto to count measuring units which indicate the measured linear distance, and compensating means cooperating with said angular measuring means and said reversible counter means for responding to the angular error measured by said angular measuring means to transmit signals to said reversible counter means for adding to or subtracting from the units counted thereby units which will compensate for the angular error.

5. The combination of claim 1 and wherein said laser means includes a single laser light source supplying light utilized by both of said measuring means.

6. The combination of claim 5 and wherein said laser means includes a beam splitter means receiving light from said single light source and transmitting light on the one hand to said linear measuring means and on the other hand to said angular measuring means.

7. The combination of claim 6 and wherein said linear measuring means includes a light-reflecting means fixed to said body and having an internally reflecting portion for receiving internally one light beam and for reflecting a second light beam parallel to said one light beam, said light-reflecting means including an exterior surface portion which is totally reflecting and which forms part of said angular measuring means.

8. The combination of claim 7 and wherein said angular measuring means includes a member formed with a slit, means for sinusoidally reciprocating said member, means on one side of said member for directing a spot of light reflected from said surface of said light-reflecting means through said slit, means on the other side of said member for responding to light passing through said slit to generate correction signals, and counting means coacting with said linear measuring means for counting measuring units and for receiving said correction signals to compensate for angular error.

9. In a measuring method, the steps of directing a single laser light beam from a single laser light source to a laser interferometer which measures the linear distance through which a body moves along an optical axis of the light source and interferometer, counting a number of units each equal to a predetermined fraction of a wavelength of the laser light beam provided by said interferometer for determining the distance, the latter distance being equal to a distance along a measuring axis which is parallel to the optical axis and spaced therefrom by a given distance, simultaneously measuring with part of said laser light beam angular deviation of said body with respect to said optical axis while acting on the latter light with an auto-collimator, then converting said angular deviation into an error distance along said measuring axis by utilizing said given distance between said axes, and adding or subtracting the latter error distance from the number of units counted according to movement of said body along said optical axis each time said error distance reaches a magnitude corresponding to one of said units.

* * * * *